United States Patent
Samaniego et al.

(10) Patent No.: US 10,650,612 B2
(45) Date of Patent: *May 12, 2020

(54) SYSTEM AND METHOD FOR COMBINING 3D IMAGES IN COLOR

(71) Applicant: RAYTHEON COMPANY, Waltham, MA (US)

(72) Inventors: Raymond Samaniego, Prosper, TX (US); John L. Tomich, Coppell, TX (US)

(73) Assignee: Raytheon Company, Waltham, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/435,275

(22) Filed: Jun. 7, 2019

(65) Prior Publication Data

US 2019/0295329 A1 Sep. 26, 2019

Related U.S. Application Data

(63) Continuation of application No. 16/138,764, filed on Sep. 21, 2018, now Pat. No. 10,366,545, which is a
(Continued)

(51) Int. Cl.
*G06K 9/00* (2006.01)
*G06T 19/20* (2011.01)
(Continued)

(52) U.S. Cl.
CPC ............ *G06T 19/20* (2013.01); *G06T 3/60* (2013.01); *G06T 15/08* (2013.01); *G06T 15/506* (2013.01);
(Continued)

(58) Field of Classification Search
CPC ......... G06T 19/20; G06T 3/60; G06T 15/506; G06T 2207/10024; G06T 2207/10081;
(Continued)

(56) References Cited

U.S. PATENT DOCUMENTS 4,680,709 A * 7/1987 Srinivasan ............ G06T 11/005
378/14
6,002,739 A * 12/1999 Heumann ............. G06T 11/006
378/21
(Continued)

OTHER PUBLICATIONS

Fishman, Elliot K. et al., "Volume Rendering versus Maximum Intensity Projection in CT Angiography: What Works Best, When, and Why", Radio Graphics, May-Jun. 2006, pp. 905-922, vol. 26, No. 3.
(Continued)

*Primary Examiner* — Jonathan S Lee
(74) *Attorney, Agent, or Firm* — Lewis Roca Rothgerber Christie LLP

(57) ABSTRACT

A system and method for visualizing data obtained by performing a three-dimensional scan with penetrating radiation. Raw density arrays are formed from the scan, each raw density array being a three-dimensional array. A processed density array is formed by one or more operations, such as taking the difference between two raw density arrays, rotating the processed density array, multiplying the processed density array by a front-lighting array, and projecting the processed density array onto a plane to form an image, the projecting including calculating one or more of a plurality of statistics for each of a set of vectors each corresponding to a pixel of the image, the plurality of statistics including a vector mean, a vector maximum, and a vector standard deviation.

20 Claims, 2 Drawing Sheets

Related U.S. Application Data continuation of application No. 15/489,652, filed on Apr. 17, 2017, now Pat. No. 10,102,682.

(51) Int. Cl.
  *G06T 3/60* (2006.01)
  *G06T 15/50* (2011.01)
  *G06T 15/08* (2011.01)

(52) U.S. Cl.
  CPC .............. *G06T 2207/10024* (2013.01); *G06T 2207/10081* (2013.01); *G06T 2207/20224* (2013.01); *G06T 2207/30096* (2013.01); *G06T 2210/41* (2013.01)

(58) Field of Classification Search
  CPC . G06T 2207/20224; G06T 2207/30096; G06T 2210/41
  USPC .......................................................... 382/131
  See application file for complete search history.

(56) References Cited

U.S. PATENT DOCUMENTS

| | | | |
|---|---|---|---|
| 6,867,774 | B1 | 3/2005 | Halmshaw et al. |
| 7,046,831 | B2 | 5/2006 | Ruchala et al. |
| 7,653,264 | B2 | 1/2010 | Hero et al. |
| 8,045,770 | B2 * | 10/2011 | Reeves ................ G06T 7/0012 382/128 |
| 9,218,674 | B2 * | 12/2015 | Yuan ..................... G06T 11/006 |
| 10,102,682 | B1 | 10/2018 | Samaniego et al. |
| 2008/0002873 | A1 | 1/2008 | Reeves et al. |
| 2011/0150309 | A1 | 6/2011 | Barfett et al. |
| 2012/0038644 | A1 | 2/2012 | Jones et al. |

OTHER PUBLICATIONS

International Search Report for corresponding International Application No. PCT/US2018/015693, filed Jan. 29, 2018, International Search Report dated Apr. 17, 2018, and dated Apr. 24, 2018 (4 pgs.).

Kitano, S. et al., "Quantitative CT color mapping of the arterial enhancement fraction of the liver: A useful tool for the diagnosis of local hepatocellular carcinoma recurrences after TACE?", European Society of Radiology, Feb. 2009, pp. 1-17.

Mindek, "Maximum Intensity Projection Weighted by Statistical Cues", Proceedings of CESCG 2011, URL:http://old.cescq.orq/CESCG-2011/papers/TUBratislava-Mindek-Peter.pdf, retrieved Apr. 17, 2018 (7 pgs.).

Persson, "Standardized Volume Rendering for Magnetic Resonance Angiography Measurements in the Abdominal Aorta", vol. 47, No. 2, Mar. 1, 2006 (pgs. 172-178).

Written Opinion of the International Searching Authority for corresponding International Application No. PCT/US2018/015693, filed Jan. 29, 2018, Written Opinion of the International Searching Authority dated Apr. 24, 2018 (5 pgs.).

\* cited by examiner

SYSTEM AND METHOD FOR COMBINING 3D IMAGES IN COLOR

CROSS-REFERENCE TO RELATED APPLICATION(S)

The present application is a continuation of U.S. patent application Ser. No. 16/138,764, filed Sep. 21, 2018, entitled "SYSTEM AND METHOD FOR COMBINING 3D IMAGES IN COLOR", issued Jul. 30, 2019 as U.S. Pat. No. 10,366,545, which is a continuation of U.S. patent application Ser. No. 15/489,652, filed Apr. 17, 2017, entitled "SYSTEM AND METHOD FOR COMBINING 3D IMAGES IN COLOR", issued Oct. 16, 2018 as U.S. Pat. No. 10,102,682; the entire contents of both of the applications identified in this paragraph are incorporated herein by reference.

FIELD

One or more aspects of embodiments according to the present invention relate to imaging, and more particularly to displaying images representing the internal structure of an object.

BACKGROUND

A computerized axial tomography (CAT) scan is a diagnostic procedure that may be used to obtain information about the internal structure of an object, such as a patient. CAT scans may be used to detect indications of cancer. Cancer in some organs, such as the pancreas, may be difficult to detect with a CAT scan because of the position of the organ within the body and the homogeneity of the surrounding tissue. These characteristics may reduce the detail perceptible in a CAT scan image.

Thus, there is a need for an improved system and method for processing data from a CAT scan.

SUMMARY

Aspects of embodiments of the present disclosure are directed toward a system and method for visualizing data obtained by performing one or more three-dimensional scans, e.g., with penetrating radiation. Raw density arrays are formed from the scan, each raw density array being a three-dimensional array. A processed density array is formed by one or more operations, such as taking the difference between two raw density arrays, rotating the processed density array, multiplying the processed density array by a front-lighting array, and projecting the processed density array onto a plane to form an image, the projecting including calculating one or more of a plurality of statistics for each of a set of vectors each corresponding to a pixel of the image, the plurality of statistics including a vector mean, a vector maximum, and a vector standard deviation.

According to an embodiment of the present invention there is provided a method for visualizing scan data, the method including: forming a first processed density array from a plurality of raw density arrays, each of the first processed density array and the raw density arrays being a three dimensional array having a plurality of array elements, each element of each of the raw density arrays representing a density of a scanned portion of an object; projecting the first processed density array onto a plane to form a plurality of first pixel values at a plurality of pixel locations, the projecting including: forming a vector for each pixel, the vector corresponding to array elements, of the plurality of array elements of the first processed density array, along a line perpendicular to the plane and passing through the pixel location; calculating a plurality of statistics for each vector; and calculating the first pixel value for each vector as a weighted sum of the statistics of the plurality of statistics; and displaying an image including a plurality of pixels, each pixel having a first value equal to a corresponding first pixel value.

In one embodiment, the plurality of statistics includes two statistics selected from the group consisting of a vector mean, a vector maximum, and a vector standard deviation, wherein the method further includes: forming a second processed density array from the plurality of raw density arrays; projecting the second processed density array onto the plane to form a plurality of second pixel values at the plurality of pixel locations; forming a third processed density array from the plurality of raw density arrays; and projecting the third processed density array onto the plane to form a plurality of third pixel values at the plurality of pixel locations, wherein displaying the image includes displaying each pixel of the image with a first color intensity proportional to the corresponding first pixel value, a second color intensity proportional to the corresponding second pixel value, and a third color intensity proportional to the corresponding third pixel value.

In one embodiment, forming the first processed density array from the plurality of raw density arrays includes subtracting a first raw density array of the plurality of raw density arrays from a second raw density array of the plurality of raw density arrays; forming the second processed density array from the plurality of raw density arrays includes subtracting the first raw density array from a third raw density array of the plurality of raw density arrays; and forming the third processed density array from the plurality of raw density arrays includes subtracting the first raw density array from a fourth raw density array of the plurality of raw density arrays.

In one embodiment, the first raw density array is a result of a scan performed before the introduction of a contrast agent into the object, the second raw density array is a result of a scan performed a first time interval after the introduction of a contrast agent into the object, the third raw density array is a result of a scan performed a second time interval after the introduction of a contrast agent into the object, the fourth raw density array is a result of a scan performed a third time interval after the introduction of a contrast agent into the object, and the second time interval is longer than the first time interval, and the third time interval is longer than the second time interval.

In one embodiment, forming the first processed density array from the plurality of raw density arrays includes: subtracting a first raw density array of the plurality of raw density arrays from a second raw density array of the plurality of raw density arrays to form a third processed density array; and rotating the third processed density array through a first angle about an axis parallel to one of the three dimensions of the first raw density array to form a fourth processed density array.

In one embodiment, the axis is parallel to the plane.

In one embodiment, the third processed density array consists of a plurality of two-dimensional slices, each slice being a two-dimensional array perpendicular to the axis, and wherein the rotating of the third processed density array includes rotating each of the slices through the first angle to form a corresponding slice of the fourth processed density array.

In one embodiment, the rotating of a slice of the third processed density array includes interpolating, from a plurality of elements of the slice of the third processed density array, a value of an element of a corresponding slice of the fourth processed density array.

In one embodiment, the interpolating includes using a bilinear interpolation method.

In one embodiment, each vector is a one-dimensional sub-array of the first processed density array, the plane being perpendicular to a first dimension of the three dimensions of the array, and the one dimensional sub-array being along the first dimension.

In one embodiment, the forming of the first processed density array includes: forming a third processed density array by subtracting a first raw density array from a second raw density array, the third processed density array consisting of a plurality of two-dimensional slices, each slice being a two-dimensional array perpendicular to the plane, and multiplying each slice, element by element, by a front-lighting array having the same dimensions as the slice, a first array element of the front-lighting array, nearer a virtual viewing point separated from the third processed density array along a line perpendicular to the plane, having a value less than a value of a second array element of the front-lighting array farther from the virtual viewing point.

In one embodiment, within a contiguous subset of elements of the front-lighting array, each of the elements of the front lighting array has a value proportional to the square of a first coordinate of the element, the first coordinate being a coordinate in a direction perpendicular to the plane.

In one embodiment, within a first contiguous subset of elements of the front-lighting array, each of the elements of the front lighting array has a value proportional to the fourth power of a first coordinate of the element, the first coordinate being a coordinate in a direction perpendicular to the plane.

In one embodiment, the method includes the first contiguous subset of elements of the front-lighting array, each of the elements of the front lighting array with a first coordinate exceeding a threshold has a value of zero.

According to an embodiment of the present invention there is provided a system for generating a view of an interior of an object, the system including: a scanner for scanning the object with penetrating radiation and measuring the transmission of the penetrating radiation through the object; a processing circuit; and a display, the processing circuit being configured to: form a first processed density array from a plurality of raw density arrays, each of the first processed density array and the raw density arrays being a three dimensional array including a plurality of array elements, each element of each of the raw density arrays representing a density of a scanned object; project the first processed density array onto a plane to form a plurality of first pixel values at a plurality of pixel locations, the projecting including: forming a vector for each pixel, the vector corresponding to array elements, of the plurality of array elements of the first processed density array, along a line perpendicular to the plane and passing through the pixel location; calculating a plurality of statistics for each vector; and calculating the first pixel value for each vector as a weighted sum of the statistics of the plurality of statistics; and display an image including a plurality of pixels, each pixel having a first value equal to a corresponding first pixel value.

In one embodiment, the plurality of statistics includes two statistics selected from the group consisting of a vector mean, a vector maximum, and a vector standard deviation, and wherein the forming of the first processed density array from the plurality of raw density arrays includes: subtracting a first raw density array of the plurality of raw density arrays from a second raw density array of the plurality of raw density arrays to form a third processed density array; and rotating the third processed density array through a first angle about an axis parallel to one of the three dimensions of the first raw density array to form a fourth processed density array.

In one embodiment, the third processed density array consists of a plurality of two-dimensional slices, each slice being a two-dimensional array perpendicular to the axis, and wherein the rotating of the third processed density array includes rotating each of the slices through the first angle to form a corresponding slice of the fourth processed density array.

In one embodiment, the forming of the first processed density array includes: forming a third processed density array by subtracting a first raw density array from a second raw density array, the third processed density array consisting of a plurality of two-dimensional slices, each slice being a two-dimensional array perpendicular to the plane, and multiplying each slice, element by element, by a front-lighting array having the same dimensions as the slice, a first array element of the front-lighting array, nearer a virtual viewing point separated from the third processed density array along a line perpendicular to the plane, having a value less than a value of a second array element of the front-lighting array farther from the virtual viewing point.

In one embodiment, within a contiguous subset of elements of the front-lighting array, each of the elements of the front lighting array has a value proportional to the square of a first coordinate of the element, the first coordinate being a coordinate in a direction perpendicular to the plane.

According to an embodiment of the present invention there is provided a system for generating a view of an interior of an object, the system including: a processing circuit; and a display, the processing circuit being configured to: form a first processed density array from a plurality of raw density arrays, each of the first processed density array and the raw density arrays being a three dimensional array including a plurality of array elements, each element of each of the raw density arrays representing a density of a scanned object; project the first processed density array onto a plane to form a plurality of first pixel values at a plurality of pixel locations, the projecting including: forming a vector for each pixel, the vector corresponding to array elements, of the plurality of array elements of the first processed density array, along a line perpendicular to the plane and passing through the pixel location; calculating a plurality of statistics for each vector; and calculating the first pixel value for each vector as a weighted sum of the statistics of the plurality of statistics; and display an image including a plurality of pixels, each pixel having a first value equal to a corresponding first pixel value.

BRIEF DESCRIPTION OF THE DRAWINGS

Features, aspects, and embodiments are described in conjunction with the attached drawings, in which.

DETAILED DESCRIPTION

The detailed description set forth below in connection with the appended drawings is intended as a description of exemplary embodiments of a system and method for displaying three-dimensional imaging data provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

A computerized axial tomography (CAT) scan is a procedure in which an object (e.g., a patient) is illuminated from several directions with penetrating (e.g., X-ray) radiation from a radiation source, and a raw scan image of the transmitted radiation is formed, in each instance, by a detector, to form a plurality of raw scan images, each of which may be represented as a two-dimensional array. The radiation may be attenuated at different rates in different kinds of matter; accordingly, each point in each image may correspond to a transmitted radiant intensity depending on the attenuation rates of the compositions of matter on the path along which the radiation traveled from the radiation source to the detector. From the combination of raw scan images a three-dimensional model of the "density" of the object may be formed, where, as used herein with respect to CAT scans, the "density" refers to the local rate of attenuation of the penetrating radiation. Although examples are discussed in the present disclosure in the context of CAT scans of a human patient, the invention is not limited thereto, and in some embodiments other kinds of scans providing three-dimensional density data such as magnetic resonance imaging scans or positron emission tomography scans, or scans of objects other than human patients may be processed in an analogous fashion. In other embodiments, for example, another scanning method, that generates scans that are spatially registered in 3 dimensions to a sub-voxel level and in which there are differences between values in the scans that lend themselves to a 3 color display, is used. In the case of other kinds of scans, density may be defined accordingly; in the case of a positron emission tomography scan, for example, the density may be the density of nuclei that decay by beta plus emission. As used herein, the term "object" includes anything that may be scanned, and encompasses without limitation human patients, animals, plants, inanimate objects, and combinations thereof.

Figure 1:
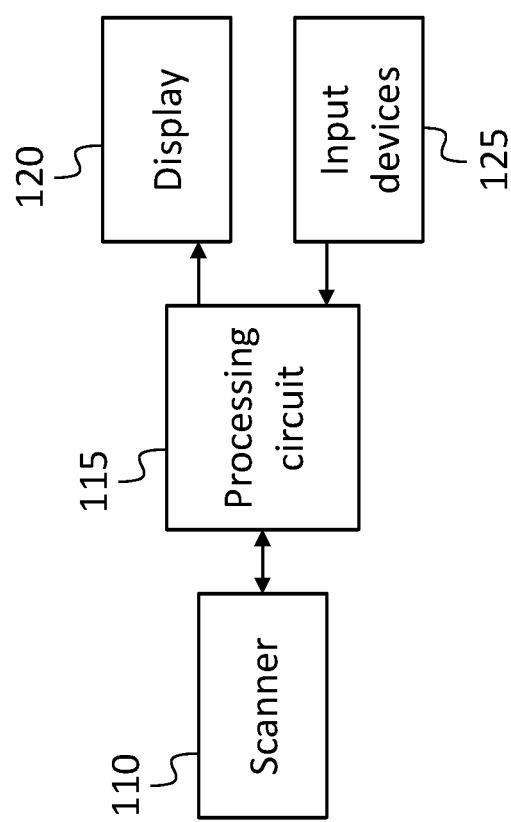
FIG. 1 is a system for generating images of the interior of an object, according to an embodiment of the present invention.

When the object being imaged is a human patient (or other living object), a contrast agent may be used (e.g., injected into or ingested by the patient) to selectively alter the density of some tissues. The contrast agent may for example include a relatively opaque substance (i.e., relatively opaque to the penetrating radiation). The density of tissue containing the contrast agent may be increased as a result, and it may be increased to an extent that depends on the concentration of contrast agent in the tissue. FIG. 1 shows a block diagram of a system for performing a scan and processing and displaying the results, according to one embodiment. The system includes a scanner 110, a processing circuit 115 (described in further detail below), a display 120 for displaying images, or sequences of images in the form of a movie, and one or more input devices 125 such as a keyboard or mouse, that an operator (e.g., a radiologist) may use to operate the system, and to set parameters affecting the processing of the images to be displayed. It should be noted that the processing circuit 115, display 120, and input devices 125 could be part of a unitary system or could be a distributed system with the processing circuit 115, for example, being separate and communicatively coupled to the display 120 and input devices 125. In some embodiments servers store the images and clients call the images, with image processing performed on the server or on the client, or both.

A plurality of scans may be performed, and analyzed together. For example, a first scan may be performed before the contrast agent is injected, and several subsequent scans may be performed at various times (e.g., at regular intervals) after injection of the contrast agent, as the concentration of contrast agent changes. The rate at which the concentration of contrast agent increases initially, the peak concentration reached, and the rate at which the concentration of contrast agent subsequently decreases all may depend on the type of tissue.

Figure 2:
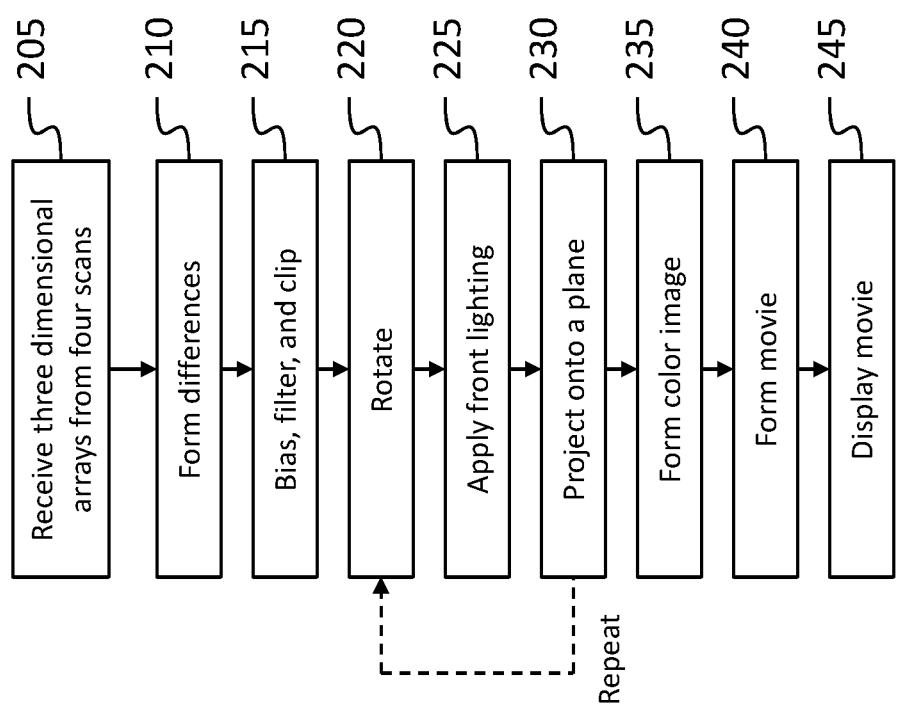
FIG. 2 is a flow chart of a method for generating images of the interior of an object, according to an embodiment of the present invention.

In some embodiments, various methods may be employed to generate images from CAT scan data to aid in the use of a CAT scan as a diagnostic tool. A sequence of steps, or "acts" illustrated in FIG. 2 and discussed in further detail below may be used, for example, to form a color movie from a set of four scans. In some embodiments, more or fewer than four scans are used. In some embodiments, arrays containing the three-dimensional scan data may be received (from the scanner 110, via a portion of the processing circuit 115 that converts raw scan images to raw density arrays, or via processes, executed in the processing circuit 115, that perform this conversion), in an act 205, subtracted to form differences, in an act 210, and filtered (after the optional addition of a bias) and clipped, in an act 215. The results may then be rotated, in an act 220, subjected to a front-lighting process, in an act 225, and projected onto a plane, in an act 230. Several such projections (e.g., three projections) may be combined, in an act 235, to form a color image (with the three projections corresponding, for example, to red, green, and blue components of the color image). A sequence of color images (each having been rotated, for example, to a slightly different angle) may be formed by repeating acts 220-230, and may then be combined, in an act 240, into a movie (e.g., a movie showing the scanned object rotating). The movie may be displayed, in an act 245, to an operator. Acts 205-240 may be performed by the processing circuit 115.

The code listed in Listing 1 shows MATLAB™ code for generating a sequence of images that may be viewed as a movie. The code of Listing 1 receives as input a plurality of CAT scan data files. Each of the files sample_patient_1_a3_no_filt.mat, sample_patient_2_a3_no_filt.mat, sample_patient_3_a3_no_filt.mat, and sample_patient_4_a3_no_filt.mat defines a three dimensional array referred to herein as a "raw density array" (e.g., a first raw density array, a second raw density array, a third raw density array, and a fourth raw density array), in the variable a3. Each element of each raw density array represents the density of tissue in a small volume or "voxel" at a physical location in the patient corresponding to the coordinates of the element.

These (three-dimensional) raw density arrays may be generated (to then be received, in act 205) from the (two-dimensional) raw scan images using, e.g., a deconvolution process to infer the density, in three dimensions, of the object (e.g., the patient) being scanned. The first file may include data from a scan performed before a contrast agent was injected into the patient, and the remaining three files may include data from scans performed at 2 minute intervals after the contrast agent was injected into the patient. However, it should be understood that use of a contrast agent is not required and/or other timing intervals or number of images could be used. For example, monochrome projections, and a monochrome movie, may be formed from a single scan, using the methods described in further detail below. Lines 34-41 of Listing 1 have the effect of reading the four data files and copying the respective 3-dimensional arrays into four respective variables scan1, scan2, scan3, and scan4, respectively. In lines 43-45 of Listing 1, the first scan (taken without contrast agent) is subtracted (e.g., subtracted element-by-element) from each of the other three scans, to form three density arrays, or "processed" density arrays, in the variables scan21, scan31, and scan41 respectively. As used herein, a "processed density array" is any three dimensional density array formed directly or indirectly from one or more raw density arrays, and used to form projections onto images or to form, by further processing, another processed density array. The processed density arrays that result from processing raw density arrays or other processed density arrays (by one or more processing steps, some of which may be optional) may be referred to as a first processed density array, a second processed density array, a third processed density array, a fourth processed density array, a fifth processed density array, a sixth processed density array, and the like, to distinguish them from each other.

As mentioned above, each voxel of each density array may correspond to a physical location in the object (e.g., in the patient). The position of the location may be identified by coordinates in a three dimensional (e.g., Cartesian) coordinate system with X, Y, and Z axes. Accordingly, every voxel may have X, Y, and Z coordinates that may be specified by its position (e.g., in centimeters or millimeters) with respect to the origin of the coordinate system (which may be somewhere within the patient). Each element of the density array may be indexed by a tuple (or 3-tuple) of three integers, and each element may also be identified by the coordinates of the voxel to which it corresponds (which may, for brevity be referred to as the coordinates of the array element). The 3-tuple may be written (x, y, z) and may include an x index ranging between 1 and Nx, a y index ranging from 1 to Ny and a z index ranging from 1 to Nz, where Nx, Ny, Nz are integers, defined on line 64 of Listing 1, specifying the size of the raw density array.

In lines 50-52 of Listing 1, each of the three differences scan 21, scan 31, and scan41 is filtered with a three dimensional median filter. Each voxel of the filter output may be the median of an m×m×m neighborhood around the corresponding voxel in the filter input, with the variable "NMED" containing the scalar m. It should be noted that the function medfilt3( ) of Listing 1 is not the function of the same name built in to MATLAB™, but another function having similar effect (but receiving a scalar value for LAMED, instead of a vector). The three filter outputs are assigned to respective colors (where the variable red corresponds to red, the variable grn corresponds to green, and the variable blu corresponds to blue), for display in subsequent portions of Listing 1.

In lines 55-57, elements of the color-assigned filter outputs with values less than 0 are rounded up (or "clipped") to zero, and in lines 60-62, three new arrays are initialized (to single-precision numbers, for processing speed and to avoid excessive memory usage). A bias (the variable bias) may be used to adjust the contrast during the filter and color assignation step; by adding a negative bias before the clipping operation, for example, lower intensity values may be set to zero, increasing contrast. The bias is set to −1050 in Listing 1; in some embodiments it is set by the operator, e.g., using the input devices 125 or it may be based on the contrast agent used or the body part being imaged.

For example, the longitudinal axis of a human patient (i.e., the height axis) may be defined as the Z axis, a front-rear axis as the X axis, and a left-right axis as the Y axis. The sequence of images may then be formed as a sequence of projections, onto a plane, of the three dimensional arrays rotated by varying amounts. Each projection may approximate what a "virtual viewer", located at a "virtual viewing point" at a distance from the patient along a line (a "simulated viewing direction") perpendicular to the plane, might see if the patient were partially transparent, so that the patient's internal organs were visible. For example, the arrays representing the tissue density may be rotated about the Z axis and projected onto the Y-Z plane, to generate a sequence of images that correspond to what the virtual viewer might see if the patient were partially transparent, and if the patient were standing in front of the virtual viewer, on a rotating platform, with the virtual viewer viewing the patient from a simulated viewing direction along the X axis. In other embodiments, the axis of rotation of the three dimensional arrays may be the X axis or the Y axis instead of the Z axis, and the simulated direction may be along the Y axis or the Z axis.

In Listing 1, the constants ROTXY, ROTXZ and ROTYZ are used to identify different combinations of (i) the axis about which the arrays representing the tissue density are rotated and (ii) the viewing direction of the virtual viewer. In some embodiments the simulated viewing direction is chosen to be perpendicular to the axis of rotation (i.e., the plane onto which the processed density matrix is projected is chosen to be parallel to the axis of rotation), so that some organs pass in front of or behind other organs as the density array is rotated. The plane may be chosen to be perpendicular to one of the axis of the system (and to one of the dimensions of the processed density array) for ease of computation. In this case the projection may operate on one vector of the processed density array at a time, each vector being a one-dimensional subarray perpendicular to the plane. In other embodiments the plane is at an arbitrary angle so that each line perpendicular to the plane and passing through a pixel location may not be aligned with any of the three dimensions of the processed density array; in such a case interpolation may be used to form a vector of density values along each such line, before performing the projection to the pixel through which the line passes.

In each projection, weighting may be used to enhance the visibility of certain features, e.g., certain organs, or abnormalities, such as tumors. For example, features that are near the virtual viewer may be enhanced and features that are more distant may be suppressed, so that in a front view the spine, for example, which may have high density but which is more distant from the virtual viewer, need not obscure organs that are nearer the virtual viewer.

Lines 70-72 of Listing 1 correspond to the case in which the arrays representing the tissue density are rotated about the Z axis and projected onto the Y-Z plane. The weighting array in the variable front_lighting may be used to emphasize parts of the object that are nearer the virtual viewer, when the axis of rotation is the Z axis, and the simulated viewing direction is along the X axis. For example, lines 71 and 72 form a two dimensional array in the X-Y plane (i.e., having a first coordinate associated with the X direction and a second coordinate associated with the Y direction) that varies as the fourth power of the X index over a range of values of the X index (the range excluding the first 120 elements and the last 50 elements in the X direction), and being zero elsewhere (i.e., the first 120 elements and the last 50 elements in the X direction being zero). In this manner, if, for example, in a front view, the spine falls entirely within the 50 most distant elements from the virtual viewer, it may be eliminated from the projection entirely, after the rotated three dimensional array is multiplied by the array front_lighting. Similarly, a portion of the patient's ribs, which may also have high density and a correspondingly high capability to obscure internal organs may be located within the 120 elements nearest the virtual viewer and may also be eliminated by the use of the front-lighting array of lines 71 and 72. Other similar front-lighting arrays (that vary quadratically instead of as the fourth power) are formed for viewing along the Z direction, for rotation about the Y axis (in line 67) or for rotation about the X axis (in line 69). In Listing 1 quadratic weighting is used for the ROTXZ and ROTYZ cases and fourth-power weighting for the ROTXY case; in other embodiments either kind of weighting (or other kinds of weighting, e.g., cubic weighting) may be used with any combination of the axis of rotation and the simulated viewing direction.

Lines 87-169 define a loop (referred to herein as the "angle loop") that generates, for each iteration, an image of the sequence of images, each for a different rotation angle of the processed density arrays (and simulating a different viewing direction through the patient). The range of angles and angle increment are defined in lines 75-80.

At each angle, each of the three processed density arrays (corresponding to red, green, and blue) is processed one slice at a time, in a for loop (referred to herein as the "slice loop") extending from line 89 to line 123, indexed by a slice index n. Each slice is the two dimensional array perpendicular to the axis of rotation, at one value of the index n corresponding to a position along the axis of rotation. For example, for rotation about the Y axis (lines 91-94) slices parallel to the XZ plane are extracted from each of the processed density arrays red_temp, grn_temp, and blu_temp.

Each of the slices is then rotated by the current angle, in a corresponding call to imrotate( ) on lines 106-108. The MATLAB™ function imrotate( ) rotates a two-dimensional array that is the first argument of the function through an angle specified in a second argument, using an interpolation method specified in the third argument and having a size specified by the fourth argument. In the example code of lines 106-108, bilinear interpolation is specified, and the value 'crop' specifies that the array returned by the function be the same size as the array passed to the function as the first argument.

In lines 110-122, three new three dimensional arrays are assembled from the slices, and front lighting is applied to emphasize portions of the three dimensional arrays that are nearer the virtual viewer. The front lighting is accomplished by multiplying each rotated slice by the array front_lighting, which (as mentioned above) may contain values that are larger in the direction of the virtual viewer. This array, as mentioned above, may also include the value 0 in some elements, which may have the effect of setting to zero regions of the slice (e.g., ones that are within a stripe of voxels farthest from the viewer and/or ones that are within a stripe of voxels nearest the virtual viewer).

Three "monochrome" arrays red_im, grn_im, and blu_im are formed on lines 128-130 (for a viewing direction parallel to the Z axis, i.e., for either ROTXZ or ROTYZ) or on lines 150-152 (for a viewing direction parallel to the X axis, i.e., for ROTXZ). Each pixel of each monochrome array is set equal to a weighted sum of up to three statistics of a vector of voxels parallel to the viewing direction and passing through the pixel location, the three statistics being a vector mean, a vector maximum, and a vector standard deviation. For example, referring to line 128, a pixel at coordinates (27, 52) of the array red_im (the coordinates 27 and 52 being used here as arbitrary values, for purposes of illustration) would be formed as the weighted sum of the three statistics (i.e., the vector mean, the vector maximum, and the vector standard deviation) of the vector of voxels with coordinates (27, 53, n) with the index n ranging from 1 to Nz. This vector of voxels is parallel to the viewing direction, and perpendicular to the plane onto which the three dimensional array red1 is projected to form the monochrome array red_im. The MATLAB™ function mean( ) calculates the mean of the array that is its first argument, along a dimension that is its second argument, to return an array that has one fewer dimension than the array that is the first argument. For a three-dimensional array, for example, the mean along the third dimension (e.g., the Z dimension) is a two-dimensional array each element of which is the mean of a corresponding vector parallel to the Z axis, within the three dimensional array. Similarly, the MATLAB™ functions max( ) and std( ) return, respectively, an array of maximum values of vectors within an input array or of standard deviations (e.g., sample standard deviations) of corresponding vectors within the input array. The weights c1, c2, and c3 may be selected (e.g., by the system designer, automatically by the system, or by the user, during operation, through a suitable user interface) to enhance the visibility of portions of the object that are of interest, and to suppress portions that are not of interest. For example, a particular organ may absorb the contrast agent more rapidly than other tissues, and as a result, it may have a significantly higher density than other tissues in the first scan after injection of the contrast agent. This may result in a large value of the standard deviation for vectors that pass through the organ, and, if the standard deviation is weighted heavily in the projection (i.e., if c3 is set to be relatively high), the organ may appear as a bright region, in the color corresponding to the first scan after injection of the contrast agent, in each projection.

Lines 132-140 and 144-147 are lines of code used for diagnostics (when other changes are made to the code of Listing 1) and have no effect on the execution of the code in Listing 1.

In lines 157-159, a color image comprising a plurality of pixels, each pixel having a first pixel value (e.g., a red intensity), a second pixel value (e.g., a green intensity), and a third pixel value (e.g., a blue intensity) is formed. The color image is assembled in the three dimensional array col_im, the first two dimensions of which correspond to pixel coordinates, and the last dimension of which (which takes a value of 1, 2, or 3) corresponds to three colors (e.g., red, green, and blue, respectively). The three color components of col_im are the three "monochrome" arrays red_im, grn_im, and blu_im.

Lines 161-167 of Listing 1 add the current color image as a frame to a movie, which, when played, will display the sequence of images generated by the angle loop, as a result, the movie will show the scanned object rotating, about the axis of rotation. The variable named gain adjusts the brightness of the images (and of the movie). This variable is set in line 11; in other embodiments it is set by the operator, e.g., using the input devices 125.

```
1   % Read in multiple CAT Scans and form 3D Images by stacking the scans
2   % Combine the multiple scans in color and render the 3D images on a 2D plot
3   % Subtract the initial image from the others to remove some of the unwanted
4   % returns such as ribs
5
6   clear
7   close all
8
9   % Contrast settings
10  bias = −1050;
11  gain = 0.3;
12
13  % Select the amount of the first image to subtract (0-1)
14  subtraction_fraction = 0;
15
16  ROTXY = 1;
17  ROTXZ = 2;
18  ROTYZ = 3;
19
20  % Select the direction of rotation for this run
21  rot_axis = ROTXY;
22
23  % Select weights for the statistics used to project the 3D image to 2D
24  c1 = 0;
25  c2 = 1;
26  c3 = 0;
27  c4 = 0;
28
29  % Select width of median filter (3 dimensional filter)
30  NMED = 3;
31
32  % Read in Scans
33
34  load sample_patient_1_a3_no_filt.mat
35  scan1 = a3;
36  load sample_patient_2_a3_no_filt.mat
37  scan2 = a3;
38  load sample_patient_3_a3_no_filt.mat
39  scan3 = a3;
40  load sample_patient_4_a3_no_filt.mat
41  scan4 = a3;
42
43  scan21=scan2−subtraction_fraction*scan1;
44  scan31=scan3−subtraction_fraction*scan1;
45  scan41=scan4−subtraction_fraction*scan1;
46
47  [Nx,Ny,Nz] = size(scan21);
48
49  % bias and filter and assign to colors
50  red = medfilt3(scan21+bias,NMED);
51  grn = medfilt3(scan31+bias,NMED);
52  blu = medfilt3(scan41+bias,NMED);
53
54  % Clip anything below zero
55  red = max(red,0);
56  grn = max(grn,0);
57  blu = max(blu,0);
58
59  % Initialize arrays
60  red1=zeros(size(red),'single');
61  grn1=zeros(size(grn),'single');
62  blu1=zeros(size(blu),'single');
63
64  [Nx,Ny,Nz] = size(red);
65
66  if rot_axis == ROTXZ
67      front_lighting = ones(Nx,1) * (1:Nz).^2;
68  elseif rot_axis == ROTYZ
69      front_lighting = ones(Ny,1) * (1:Nz).^2;
70  elseif rot_axis == ROTXY
71      front_lighting = [zeros(1,120) (Nx−120−50:−1:1) zeros(1,50)]' * ones(1,Ny);
72      front_lighting = front_lighting.^4 ./ Nx/Nx/Nx;
73  end
74
75  ANG_LIMIT = 90;
76
77  ANG_STEP = round( ANG_LIMIT/45);
78
79  ang_array = [(0:−ANG_STEP:−ANG_LIMIT),...
80      (−ANG_LIMIT+1:ANG_STEP:ANG_LIMIT),(ANG_LIMIT−1:−ANG_STEP:1)];
81
```

```
82   img_count = 0;
83
84   % Loop through many viewing angles so that the 3D image can be viewed as
85   % projected in many 2D images on the screen
86
87   for ang = ang_array
88
         for n = 1 : Ny*(rot_axis==ROTXZ) + Nx*(rot_axis==ROTYZ) +
89   Nz*(rot_axis==ROTXY)
90
             if rot_axis == ROTXZ
91
92                   red_temp = squeeze( red(:,n,:) );
93                   grn_temp = squeeze( grn(:,n,:) );
94                   blu_temp = squeeze( blu(:,n,:) );
95             elseif rot_axis == ROTYZ
96                   red_temp = squeeze( red(n,:,:) );
97                   grn_temp = squeeze( grn(n,:,:) );
98                   blu_temp = squeeze( blu(n,:,:) );
99             elseif rot_axis == ROTXY
100                  red_temp = squeeze( red(:,:,n) );
101                  grn_temp = squeeze( grn(:,:,n) );
102                  blu_temp = squeeze( blu(:,:,n) );
103            end
104
105            % Rotate images on the screen in either of the 3 axes for viewing
106            red_tempr = imrotate(red_temp,ang,'bilinear','crop');
107            grn_tempr = imrotate(grn_temp,ang,'bilinear','crop');
108            blu_tempr = imrotate(blu_temp,ang,'bilinear','crop');
109
110            if rot_axis == ROTXZ
111                  red1(:,n,:) = red_tempr .* front_lighting;
112                  grn1(:,n,:) = grn_tempr .* front_lighting;
113                  blu1(:,n,:) = blu_tempr .* front_lighting;
114            elseif rot_axis == ROTYZ
115                  red1(n,:,:) = red_tempr .* front_lighting;
116                  grn1(n,:,:) = grn_tempr .* front_lighting;
117                  blu1(n,:,:) = blu_tempr .* front_lighting;
118            elseif rot_axis == ROTXY
119                  red1(:,:,n) = red_tempr .* front_lighting;
120                  grn1(:,:,n) = grn_tempr .* front_lighting;
121                  blu1(:,:,n) = blu_tempr .* front_lighting;
122            end
123        end
124
125        if rot_axis == ROTXZ || rot_axis == ROTYZ
126
127            % Project the image from 3D to 2D sith statistics down each row
128            red_im = squeeze(c1*mean(red1,3)+c2*max(red1,[ ],3)+c3*std(red1,[ ],3));
129            grn_im = squeeze(c1*mean(grn1,3)+c2*max(grn1,[ ],3)+c3*std(grn1,[ ],3));
130            blu_im = squeeze(c1*mean(blu1,3)+c2*max(blu1,[ ],3)+c3*std(blu1,[ ],3));
131
132            col_im(:,:,1) = red_im;
133            col_im(:,:,2) = grn_im;
134            col_im(:,:,3) = blu_im;
135
136            if rot_axis == ROTXZ
137                  image(max(0,min(1,gain*col_im/mean(red_im(:)))))
138            else
139                  image(max(0,min(1,gain*col_im/mean(red_im(:)))))
140            end
141
142        elseif rot_axis == ROTXY
143
144            front_lighting1 = zeros(size(red1));
145            for z = 1 : Nz
146                  front_lighting1(:,:,z) = front_lighting;
147            end
148
149            % Project the image from 3D to 2D sith statistics down each row
150            red_im = squeeze(c1*mean(red1,1)+c2*max(red1,[ ],1)+c3*std(red1,[ ],1))';
151            grn_im = squeeze(c1*mean(grn1,1)+c2*max(grn1,[ ],1)+c3*std(grn1,[ ],1))';
152            blu_im = squeeze(c1*mean(blu1,1)+c2*max(blu1,[ ],1)+c3*std(blu1,[ ],1))';
153        end
154
155        % Put Images into Matlab RGB array 1=red, 2=grn, 3=blu in 3rd dimension
156        % Use imresize to enlarge on screen
157        col_im(:,:,1) = imresize(red_im,850/size(red_im,1),'bicubic');
158        col_im(:,:,2) = imresize(grn_im,850/size(red_im,1),'bicubic');
159        col_im(:,:,3) = imresize(blu_im,850/size(red_im,1),'bicubic');
```

```
160
161        image(max(0,min(1,gain*col_im/mean(red_im(:)))))
162        truesize
163        drawnow
164
165        img_count = img_count + 1;
166
167        Mov(img_count) = getframe;
168
169    end
```

The term "processing circuit" is used herein to include any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed wiring board (PWB) or distributed over several interconnected PWBs. A processing circuit may contain other processing circuits; for example a processing circuit may include two processing circuits, an FPGA and a CPU, interconnected on a PWB. A processing circuit may include a plurality of processing units that are geographically separated, and connected, e.g., by a network such as the internet.

It will be understood that, although the terms "first", "second", "third", etc., may be used herein to describe various elements, components, regions, arrays and/or sections, these elements, components, regions, layers and/or sections should not be limited by these terms. These terms are only used to distinguish one element, component, region, layer or section from another element, component, region, array or section. Thus, for example, a first element, component, region, array or section discussed below could be termed a second element, component, region, array or section, without departing from the spirit and scope of the inventive concept.

Although limited embodiments of a system and method for displaying three-dimensional imaging data have been specifically described and illustrated herein, many modifications and variations will be apparent to those skilled in the art. Accordingly, it is to be understood that the system and method for displaying three-dimensional imaging data employed according to principles of this invention may be embodied other than as specifically described herein. The invention is also defined in the following claims, and equivalents thereof.

What is claimed is:

1. A method for visualizing scan data, the method comprising:
   projecting a first processed density array onto a plane to form a plurality of first pixel values at a plurality of corresponding pixel locations, the projecting comprising:
      forming a vector for each pixel, the vector corresponding to array elements, of a plurality of array elements of the first processed density array, along a line perpendicular to the plane and passing through the pixel location;
      calculating one or more statistics for each vector; and
      calculating the first pixel value for each vector as a weighted sum of the statistics.

2. The method of claim 1, further comprising forming the first processed density array, the first processed density array being a three dimensional array having a plurality of array elements, each array element corresponding to a scanned portion of an object,
   wherein forming the first processed density array comprises forming a plurality of raw density arrays, each of the raw density arrays being a three dimensional array having a plurality of array elements, each array element of each of the raw density arrays representing the density of the scanned portion of the object.

3. The method of claim 2, wherein forming the first processed density array from the plurality of raw density arrays comprises:
   subtracting a first raw density array of the plurality of raw density arrays from a second raw density array of the plurality of raw density arrays to form a second processed density array; and
   rotating the second processed density array through a first angle about an axis parallel to one of the three dimensions of the first raw density array to form a fourth processed density array.

4. The method of claim 3, wherein the second processed density array consists of a plurality of two-dimensional slices, each slice being a two-dimensional array perpendicular to the axis, and wherein the rotating of the second processed density array comprises rotating each of the slices through the first angle to form a corresponding slice of the fourth processed density array.

5. The method of claim 4, wherein the rotating of a slice of the second processed density array comprises interpolating, from a plurality of elements of the slice of the second processed density array, a value of an element of a corresponding slice of the fourth processed density array.

6. The method of claim 1, wherein the one or more statistics comprise a statistic selected from the group consisting of a vector mean, a vector maximum, and a vector standard deviation,
   wherein the method further comprises:
      forming a second processed density array from a plurality of raw density arrays;
      projecting the second processed density array onto the plane to form a plurality of second pixel values at the plurality of corresponding pixel locations;
      forming a third processed density array from the plurality of raw density arrays; and
      projecting the third processed density array onto the plane to form a plurality of third pixel values at the plurality of corresponding pixel locations.

7. The method of claim 6, further comprising forming the first processed density array, the first processed density array being a three dimensional array having a plurality of array elements, each array element corresponding to a scanned portion of an object,
wherein:
forming the first processed density array from the plurality of raw density arrays comprises subtracting a first raw density array of the plurality of raw density arrays from a second raw density array of the plurality of raw density arrays;
forming the second processed density array from the plurality of raw density arrays comprises subtracting the first raw density array from a third raw density array of the plurality of raw density arrays; and
forming the third processed density array from the plurality of raw density arrays comprises subtracting the first raw density array from a fourth raw density array of the plurality of raw density arrays.

8. The method of claim 1, wherein each vector is a one-dimensional sub-array of the first processed density array, the plane being perpendicular to a first dimension of the three dimensions of the first processed density array, and the one-dimensional sub-array being along the first dimension.

9. The method of claim 1, further comprising forming the first processed density array, the first processed density array being a three dimensional array having a plurality of array elements, each array element corresponding to a scanned portion of an object,
wherein the forming of the first processed density array comprises:
forming a second processed density array by subtracting a first raw density array from a second raw density array, the second processed density array consisting of a plurality of two-dimensional slices, each slice being a two-dimensional array perpendicular to the plane, and
multiplying each slice, element by element, by a front-lighting array having the same dimensions as the slice, a first array element of the front-lighting array, nearer a virtual viewing point separated from the second processed density array along a line perpendicular to the plane, having a value less than a value of a second array element of the front-lighting array farther from the virtual viewing point.

10. The method of claim 9, wherein, within a contiguous subset of elements of the front-lighting array, each of the elements of the front-lighting array has a value proportional to the square of a first coordinate of the element, the first coordinate being a coordinate in a direction perpendicular to the plane.

11. The method of claim 9, wherein, within a first contiguous subset of elements of the front-lighting array, each of the elements of the front-lighting array has a value proportional to the fourth power of a first coordinate of the element, the first coordinate being a coordinate in a direction perpendicular to the plane.

12. The method of claim 11, wherein, within a second contiguous subset of elements of the front-lighting array comprising the first contiguous subset of elements of the front-lighting array, each of the elements of the front-lighting array with a first coordinate exceeding a threshold has a value of zero.

13. The method of claim 1, further comprising forming the first processed density array, the first processed density array being a three dimensional array having a plurality of array elements, each array element corresponding to a scanned portion of an object,
wherein forming the first processed density array comprises:
forming a first raw density array and a second raw density array, each of the raw density arrays being a three dimensional array having a plurality of array elements, each array element of each of the raw density arrays representing the density of the scanned portion of the object;
forming a second processed density array from a plurality of raw density arrays including the first raw density array and the second raw density array; and
forming a third processed density array from the second processed density array, by filtering the second processed density array with a median filter.

14. The method of claim 13, wherein:
forming the second processed density array comprises:
subtracting the first raw density array from the second raw density array, and
adding a constant; and
forming the first processed density array further comprises setting each negative element of the third processed density array to zero.

15. A system for generating a view of an interior of an object, the system comprising:
a scanner for scanning the object with penetrating radiation and measuring the transmission of the penetrating radiation through the object;
a processing circuit; and
a display,
the processing circuit being configured to:
project a first processed density array onto a plane to form a plurality of first pixel values at a plurality of corresponding pixel locations, the projecting comprising:
forming a vector for each pixel, the vector corresponding to one or more array elements of a plurality of array elements along a line perpendicular to the plane and passing through the pixel location;
calculating one or more statistics for each vector; and
calculating the first pixel value for each vector as a weighted sum of the one or more statistics.

16. The system of claim 15, wherein:
the processing circuit is further configured to form the first processed density array from one or more raw density arrays, the first processed density array being a three dimensional array comprising a plurality of array elements, each array element corresponding to the density of a scanned portion of the object;
the one or more statistics comprise a statistic selected from the group consisting of a vector mean, a vector maximum, and a vector standard deviation; and
forming the first processed density array comprises:
subtracting a first raw density array of one or more raw density arrays from a second raw density array of the one or more raw density arrays to form a second processed density array; and
rotating the second processed density array through a first angle about an axis parallel to one of the three dimensions of the first raw density array to form a third processed density array.

17. The system of claim 16, wherein the second processed density array consists of a plurality of two-dimensional slices, each slice being a two-dimensional array perpendicular to the axis, and wherein the rotating of the second processed density array comprises rotating each of the slices through the first angle to form a corresponding slice of the third processed density array.

18. The system of claim 15, wherein
the processing circuit is further configured to form the first processed density array, the first processed density array being a three dimensional array comprising a plurality of array elements, each array element corresponding to the density of a scanned portion of the object;
the forming of the first processed density array comprises:
forming a second processed density array by subtracting a first raw density array from a second raw density array, the second processed density array consisting of a plurality of two-dimensional slices, each slice being a two-dimensional array perpendicular to the plane, and
multiplying each slice, element by element, by a front-lighting array having the same dimensions as the slice, a first array element of the front-lighting array, nearer a virtual viewing point separated from the second processed density array along a line perpendicular to the plane, having a value less than a value of a second array element of the front-lighting array farther from the virtual viewing point.

19. The system of claim 18, wherein, within a contiguous subset of elements of the front-lighting array, each of the elements of the front-lighting array has a value proportional to the square of a first coordinate of the element, the first coordinate being a coordinate in a direction perpendicular to the plane.

20. A system for generating a view of an interior of an object, the system comprising:
a processing circuit;
a non-transitory storage medium; and
a display,
the non-transitory storage medium storing instructions that, when executed by the processing circuit, cause the processing circuit to:
project a processed density array onto a plane to form a plurality of pixel values at a plurality of pixel locations, the projecting comprising:
forming a vector for each pixel, the vector corresponding to array elements, of a plurality of array elements of the processed density array, along a line perpendicular to the plane and passing through the pixel location;
calculating one or more statistics for each vector; and
calculating the pixel value for each vector as a weighted sum of the one or more statistics.

* * * * *